United States Patent
Bossman et al.

(10) Patent No.: US 7,181,446 B2
(45) Date of Patent: Feb. 20, 2007

(54) QUERY TRANSFORMATION FOR QUERIES INVOLVING CORRELATED SUBQUERIES HAVING CORRELATION JOIN PREDICATES WITH LOCAL FILTERING PREDICATES INVOLVING PREDICATE TRANSITIVE CLOSURE AND PREDICATE PULL-OUT

(75) Inventors: Patrick D. Bossman, Alexandria, VA (US); Lee-Chin Hsu Liu, San Jose, CA (US); Jerry Mukai, San Jose, CA (US); Yumi K. Tsuji, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 510 days.

(21) Appl. No.: 10/764,286

(22) Filed: Jan. 23, 2004

(65) Prior Publication Data

US 2005/0165751 A1 Jul. 28, 2005

(51) Int. Cl.
*G06F 17/30* (2006.01)
*G06F 7/00* (2006.01)
(52) U.S. Cl. .................... 707/3; 707/4; 707/5
(58) Field of Classification Search ............. 707/1, 707/3, 4, 5, 100
See application file for complete search history.

(56) References Cited

U.S. PATENT DOCUMENTS

| 5,367,675 | A | 11/1994 | Cheng et al. | |
|---|---|---|---|---|
| 5,761,657 | A | 6/1998 | Hoang | |
| 5,822,750 | A * | 10/1998 | Jou et al. | 707/2 |
| 5,855,012 | A | 12/1998 | Bhargava et al. | |
| 6,385,603 | B1 * | 5/2002 | Chen et al. | 707/3 |
| RE37,965 | E | 1/2003 | Jhingran et al. | |
| 6,529,896 | B1 | 3/2003 | Leung et al. | |
| 6,560,595 | B1 | 5/2003 | Sanders et al. | |
| 6,571,233 | B2 | 5/2003 | Beavin et al. | |
| 6,826,562 | B1 * | 11/2004 | Leung et al. | 707/4 |
| 2003/0088558 | A1 | 5/2003 | Zaharioudakis et al. | |
| 2003/0120682 | A1 | 6/2003 | Bestgen et al. | |
| 2003/0167258 | A1 | 9/2003 | Kou et al. | |

* cited by examiner

*Primary Examiner*—Sam Rimell
*Assistant Examiner*—Paul Kim
(74) *Attorney, Agent, or Firm*—Gates & Cooper LLP

(57) ABSTRACT

A method, apparatus, and article of manufacture for optimizing a query in a computer system, wherein the query is performed by the computer system to retrieve data from a database stored on the computer system. The optimization is performed by identifying a correlated subquery in the query that qualifies for transformation, transitively closing a local filtering predicate within the identified correlated subquery that is on a same column as a correlation join predicate within the identified correlated subquery, and pulling out or bubbling up the transitively closed predicate from the correlated subquery to a parent query block of the query.

27 Claims, 4 Drawing Sheets

QUERY TRANSFORMATION FOR QUERIES INVOLVING CORRELATED SUBQUERIES HAVING CORRELATION JOIN PREDICATES WITH LOCAL FILTERING PREDICATES INVOLVING PREDICATE TRANSITIVE CLOSURE AND PREDICATE PULL-OUT

BACKGROUND OF THE INVENTION

1. Field of the Invention

This invention relates in general to database management systems performed by computers, and in particular, to an effective query transformation technique for queries involving correlated subqueries having correlation join predicates with local filtering predicates involving predicate transitive closure and predicate pullout.

2. Description of Related Art

Computer systems incorporating Relational DataBase Management System (RDBMS) software using Structured Query Language (SQL) interface are well known in the art. The SQL interface has evolved into a standard language for RDBMS software and has been adopted as such by both the American National Standards Institute (ANSI) and the International Standards Organization (ISO).

Most RDBMS software is capable of performing predicate transitive closure optimizations on queries. Existing predicate transitive closure optimizations recognize that a local filtering predicate against a first column of a first table can also be copied, or transitively closed, to a second column of a second table when a join predicate exists on the first and second columns.

Consider the following example query:

```
SELECT T1.*
FROM T1, T2
WHERE T1.C1 = T2.C2
      AND T1.C1 = 1;
```

In the above example, existing predicate transitive closure optimizations recognize that a local filtering predicate (=1) against a column (C1) on a table (T1) can also be copied, or transitively closed, to another column (C2) on another table (T2) when a join predicate (T1.C1=T2.C2) exists on the column that has the local filtering predicate. Consequently, the above example query can be validly transformed to the following:

```
SELECT T1.*
FROM T1, T2
WHERE T1.C1 = T2.C2
      AND T1.C1 = 1
      AND T2.C2 = 1;
```

However, existing predicate transitive closure optimizations cannot work with correlated subqueries. Consider the following example query:

```
SELECT T1.*
FROM T1
WHERE EXISTS    (SELECT T2.*
                FROM T2
                WHERE      T1.C1 = T2.C2
                AND        T2.C2 = x
                );
```

In the above example query, the correlated subquery (SELECT T2.* . . . ) contains a correlation join predicate (T1.C1=T2.C2) and a local filtering predicate (T2.C2=x). However, a predicate transitive closure optimization cannot be performed on the correlated subquery, using existing techniques. As a result, a selective local predicate that resides within the correlated subquery may not be applied as early as it could be, thereby resulting in inefficient performance. For example, the correlated subquery in the above example is executed once per qualified row generated by the outer SELECT statement, i.e., once for every row in table T1.

With existing RDBMS software, the only solution is to manually transform the query. However, it is unreasonable to expect users to always code queries in most efficient manner. Instead, it is the job of the query optimizer in the RDBMS to transform a query to improve performance.

Consequently, there is a need in the art for an effective query transformation technique for queries involving correlated subqueries having correlation join predicates with local filtering predicates involving predicate transitive closure and predicate pullout.

SUMMARY OF THE INVENTION

To overcome the limitations in the prior art described above, and to overcome other limitations that will become apparent upon reading and understanding the present specification, the present invention discloses a method, apparatus, and article of manufacture for optimizing a query in a computer system, the query being performed by the computer system to retrieve data from a database stored on the computer system. The optimization is performed by identifying a correlated subquery in the query that qualifies for transformation, transitively closing a local filtering predicate within the identified correlated subquery that is on the same column as a correlation join predicate within the identified correlated subquery, and pulling out or bubbling up the transitively closed predicate from the correlated subquery to a parent query block of the query.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown byway of illustration a specific embodiment in which the invention may be practiced. It is to be understood that other embodiments may be utilized and structural and functional changes may be made without departing from the scope of the present invention.

Hardware and Software Environment

Figure 1:
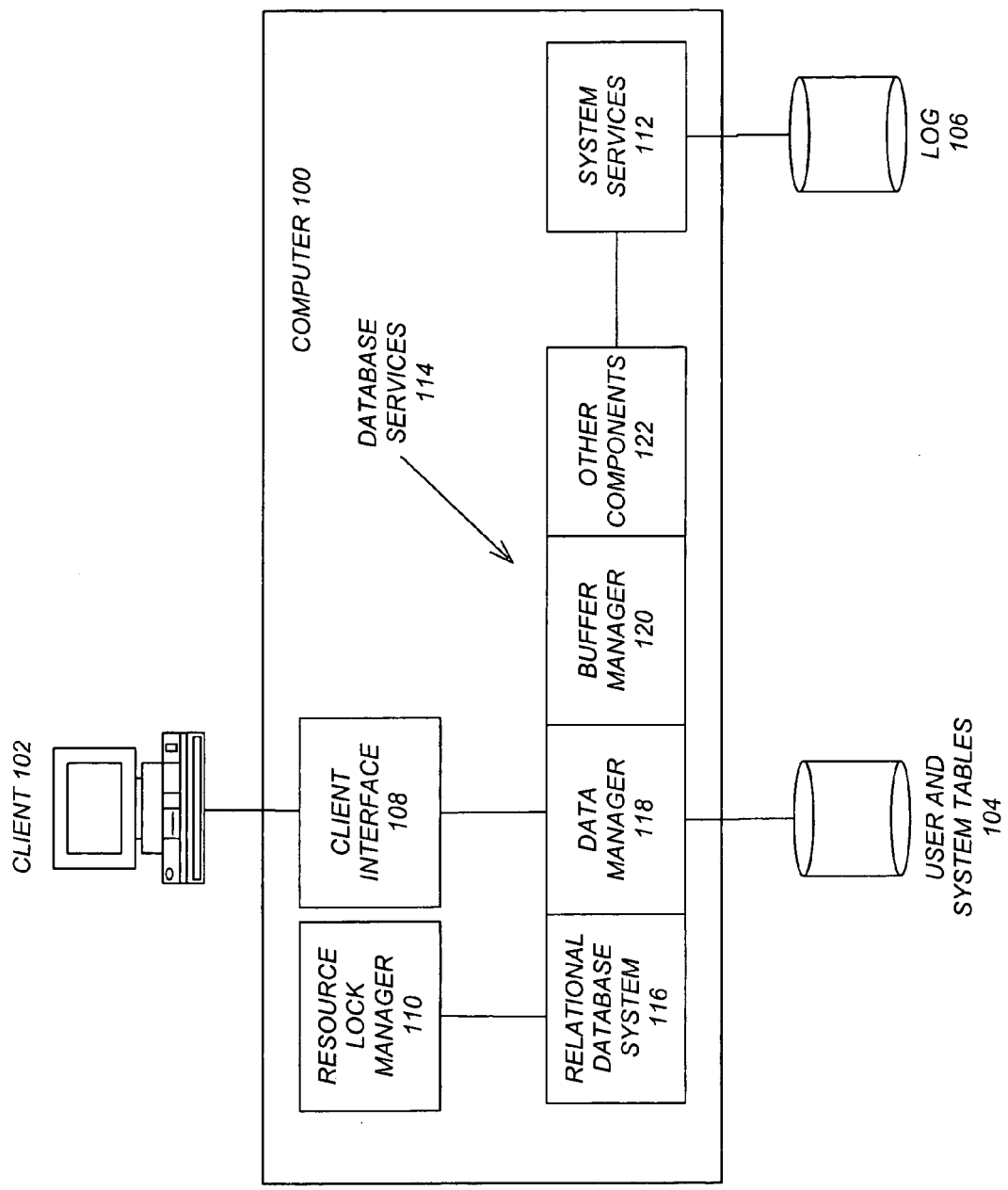
FIG. 1 illustrates an exemplary computer hardware and software environment that could be used with an embodiment of the present invention.

FIG. 1 illustrates an exemplary computer hardware and software environment that could be used with the present invention. In the exemplary environment, a server system 100 is connected to one or more client systems 102, in order to manage one or more databases 104 and 106 shared among the client systems 102.

Operators of the client systems 102 use a standard operator interface 108, such as IMS/DB/DC, CICS, TSO, OS/2 or other similar interface, to transmit electrical signals to and from the server system 100 that represent commands for performing various search and retrieval functions, termed queries, against the databases. In the present invention, these queries conform to the Structured Query Language (SQL) standard, and invoke functions performed by Relational DataBase Management System (RDBMS) software. In the preferred embodiment of the present invention, the RDBMS software comprises the DB2 product offered by IBM for the MVS, UNIX, WINDOWS or OS/2 operating systems. Those skilled in the art will recognize, however, that the present invention has application to any RDBMS software.

As illustrated in FIG. 1, the RDBMS includes three major components: the Resource Lock Manager (RLM) 110, the Systems Services module 112, and the Database Services module 114. The RLM 110 handles locking services, because the RDBMS treats data as a shared resource, thereby allowing any number of users to access the same data simultaneously, and thus concurrency control is required to isolate users and to maintain data integrity. The Systems Services module 112 controls the overall RDBMS execution environment, including managing log data sets 106, gathering statistics, handling startup and shutdown, and providing management support.

At the heart of the RDBMS architecture is the Database Services module 114. The Database Services module 114 contains several submodules, including the Relational Database System (RDS) 116, the Data Manager 118, and the Buffer Manager 120, as well as other components 122 such as an SQL compiler/interpreter. These submodules support the functions of the SQL language, i.e., definition, access control, retrieval, and update of user and system data.

Generally, each of the components, modules, and submodules of the RDBMS comprise instructions and/or data, and are embodied in or retrievable from a computer-readable device, medium, or carrier, e.g., a memory, a data storage device, a remote device coupled to the server computer 100 by a data communications device, etc. Moreover, these instructions and/or data, when read, executed, and/or interpreted by the server computer 100, cause the server computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture", or alternatively, "computer program carrier", as used herein is intended to encompass a computer program accessible from any computer-readable device, carrier, or media.

Of course, those skilled in the art will recognize many modifications may be made to this configuration without departing from the scope of the present invention. Specifically, those skilled in the art will recognize that any combination of the above components, or any number of different components, including computer programs, peripherals, and other devices, may be used to implement the present invention, so long as similar functions are performed thereby.

Interactive SQL Execution

Figure 2:
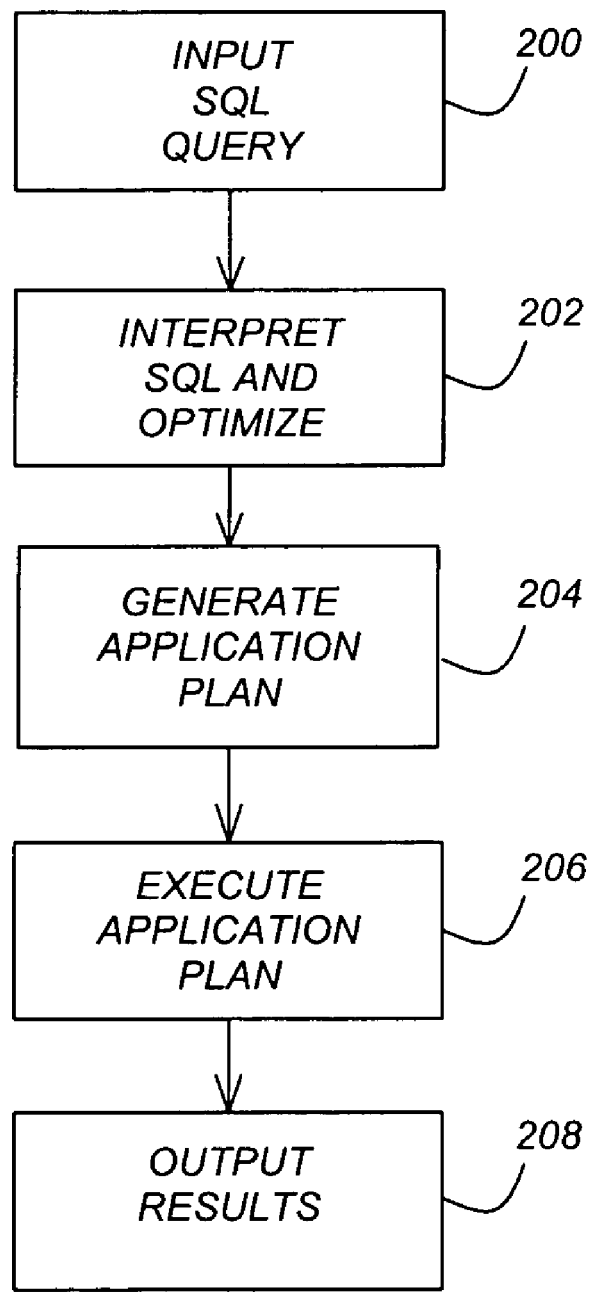
FIG. 2 is a flowchart illustrating the steps necessary for the interpretation and execution of SQL statements in an interactive environment according to an embodiment of the present invention.

FIG. 2 is a flowchart illustrating the steps necessary for the interpretation and execution of SQL statements in an interactive environment according to the present invention. Block 200 represents the input of SQL statements into the server system 100. Block 202 represents the step of compiling or interpreting the SQL statements. An optimization function within block 202 may transform or optimize the SQL query in a manner described in more detail later in this specification. Generally, the SQL statements received as input specify only the desired data, but not how to retrieve the data. This step considers both the available access paths (indexes, sequential reads, etc.) and system held statistics on the data to be accessed (the size of the table, the number of distinct values in a particular column, etc.), to choose what it considers to be the most efficient access path for the query. Block 204 represents the step of generating a compiled set of runtime structures called an application plan from the compiled SQL statements. Block 206 represents the execution of the application plan and Block 208 represents the output of the results.

Embedded/Batch SQL Execution

Figure 3:
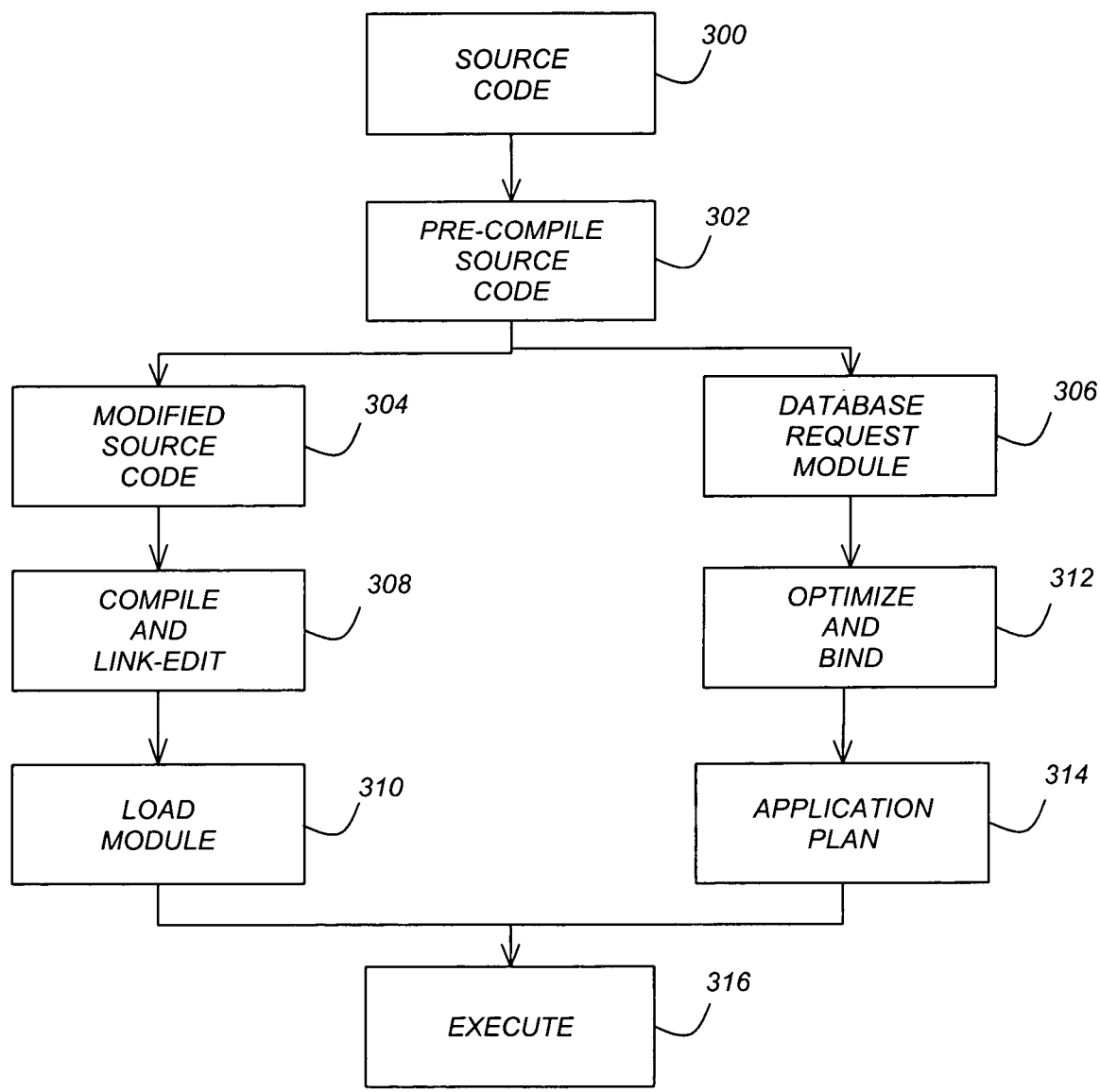
FIG. 3 is a flowchart illustrating the steps necessary for the interpretation and execution of SQL statements embedded in source code according to an embodiment of the present invention.

FIG. 3 is a flowchart illustrating the steps necessary for the interpretation and execution of SQL statements embedded in source code according to the present invention. Block 300 represents program source code containing a host language (such as COBOL or C) and embedded SQL statements. The program source code is then input to a pre-compile step 302. There are two outputs from the pre-compile step 302: a modified source module 304 and a Database Request Module (DBRM) 306. The modified source module 304 contains host language calls to the RDBMS, which the pre-compile step 302 inserts in place of SQL statements. The DBRM 306 is comprised of the SQL statements from the program source code 300. A compile and link-edit step 308 uses the modified source module 304 to produce a load module 310, while an optimize and bind step 312 uses the DBRM 306 to produce a compiled set of runtime structures for the application plan 314. As indicated above in conjunction with FIG. 2, the SQL statements from the program source code 300 specify only the desired data, but not how to retrieve the data. The optimize and bind step 312 may optimize the SQL query in a manner described in more detail later in this specification. Thereafter, the optimize and bind step 312 considers both the available access paths (indexes, sequential reads, etc.) and system held statistics on the data to be accessed (the size of the table, the number of distinct values in a particular column, etc.), to choose what it considers to be the most efficient access path for the query. The load module 310 and application plan 314 are then executed together at step 316.

Description of the Optimization Technique

The present invention discloses an improved optimization technique that is typically performed at step 202 of FIG. 2 or step 312 of FIG. 3. Specifically, the present invention discloses an effective query transformation technique for queries involving correlated subqueries having correlation join predicates with local filtering predicates, wherein the query transformation technique involves predicate transitive closure and predicate pull-out.

As noted above, existing predicate transitive closure optimizations recognize that a local filtering predicate against a column on a table can also be copied, or transitively closed, to another column on another table when a join predicate exists on the column that has the local filtering predicate. The present invention provides an extension to these optimizations, in that some correlated subqueries, where there is a local filtering predicate within the correlated subquery against a column that also has a correlation join predicate, can transitively close the local filtering predicate within the correlated subquery, and pull-out or bubble-up the transitively closed predicate to a parent query block of the query. By performing predicate transitive closure and predicate pull-out, the performance of the query statement can be greatly improved, because the parent query block may be reduced or optimized prior to execution of the correlated subquery and may use more efficient access paths.

Consider the following example query:

```
SELECT T1.*
FROM T1
WHERE EXISTS      (SELECT T2.*
                   FROM T2
                   WHERE      T1.C1 = T2.C2
                   AND        T2.C2 = x
                   );
```

Current optimization techniques cannot perform predicate transitive closure for the correlated subquery, which results in the correlated subquery being accessed once for every row in table T1.

However, the present invention operates differently by performing the following steps:

1. The present invention recognizes that, because the correlated subquery is a Boolean term, the predicate does not contain negation (e.g. NOT EXISTS), and the correlated subquery does not contain a COUNT arithmetic function, the correlated subquery is a candidate for transformation. The present invention also recognizes that the correlated subquery includes a local filtering predicate (T2.C2=x) on the same column as a correlation join predicate (T1.C1=T2.C2).

2. The present invention performs a predicate transitive closure of the local filtering predicate. This is a valid transformation because there is a correlation join predicate on the same column.

The result of this transformation on the example query is shown below:

```
SELECT T1.*
FROM T1
WHERE EXISTS      (SELECT T2.*
                   FROM T2
                   WHERE      T1.C1 = T2.C2
                   AND        T2.C2 = x
                   AND        T1.C1 = x
                   );
```

3. The present invention pulls out the transitively closed predicate (T1.C1=x) from step 2 into a parent query block (i.e., the outer SELECT statement) and applies the transitively closed predicate to a table (T1) referenced in the parent query block.

The result of this transformation on the example query is shown below:

```
SELECT T1.*
FROM T1
WHERE EXISTS      (SELECT T2.*
                   FROM T2
                   WHERE      T1.C1 = T2.C2
                   AND        T2.C2 = x)
    AND T1.C1 = x
```

This transformation allows the table referenced by the transitively closed predicate to be accessed via any index on the referenced column (C1), where this access path previously was not available. Moreover, the transitively closed predicate in the parent query block is applied prior to the correlated subquery, thereby resulting in fewer executions of the correlated subquery, which also improves performance.

Logic of the Preferred Embodiment

Figure 4:
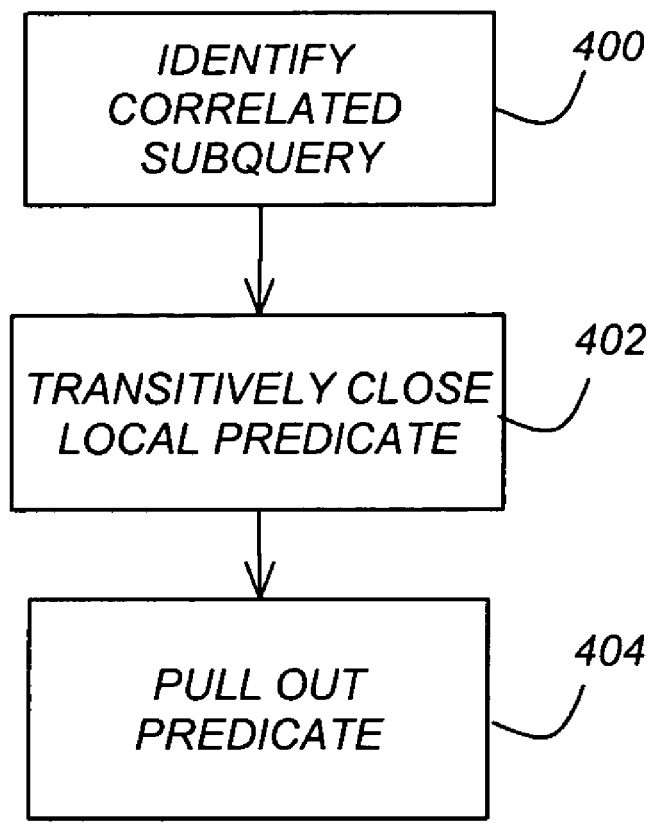
FIG. 4 is a flowchart illustrating a method of optimizing a query in a computer system, the query being performed by the computer system to retrieve data from a database stored on the computer system, according to the preferred embodiment of the present invention.

FIG. 4 is a flowchart illustrating a method of optimizing a query in a computer system, the query being performed by the computer system to retrieve data from a database stored on the computer system, according to the preferred embodiment of the present invention.

Block 400 represents the RDBMS identifying a correlated subquery in the query that qualifies for transformation according to the present invention. The identifying step further comprises the RDBMS recognizing that the correlated subquery is a Boolean term predicate that does not contain negation and the correlated subquery does not contain a COUNT arithmetic function. For example, the correlated subquery may comprise an EXISTS correlated subquery, COL IN correlated subquery, COL=ANY correlated subquery, or COL=correlated subquery, but not a NOT EXISTS correlated subquery or a correlated subquery containing a COUNT arithmetic function. The identifying step further comprises the RDBMS recognizing that the correlated subquery includes a local filtering predicate on the same column as a correlation join predicate.

Block 402 represents the RDBMS transitively closing the local filtering predicate within the correlated subquery. The transitively closing step further comprises the RDBMS performing a predicate transitive closure of the local filtering predicate.

Block 404 represents the RDBMS pulling out or bubbling up the transitively closed predicate from the correlated subquery to a parent query block of the query, e.g., an outer SELECT statement, wherein the transitively closed predicate is applied to a table referenced in the parent query block. Generally, this results in the RDBMS applying the transitively closed predicate prior to performing the correlated subquery, thereby resulting in fewer executions of the correlated subquery.

Finally, after Block 404, the RDBMS may perform further optimizations on the query. For example, the optimizations may result in the RDBMS accessing the table referenced by the transitively closed predicate via a new access path. Other optimizations may also be possible.

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any software program performing optimizations on database queries having correlated subqueries could benefit from the present invention.

In summary, the present invention discloses a method, apparatus, and article of manufacture for optimizing a query in a computer system, the query being performed by the computer system to retrieve data from a database stored on the computer system. The optimization is performed by identifying a correlated subquery in the query that qualifies for transformation, transitively closing a local filtering predicate within the identified correlated subquery that is on the same column as a correlation join predicate within the identified correlated subquery, and pulling out or bubbling up the transitively closed predicate from the correlated subquery to a parent query block of the query.

The foregoing description of the preferred embodiment of the invention has been presented for the purposes of illustration and description. It is not intended to be exhaustive or to limit the invention to the precise form disclosed. Many modifications and variations are possible in light of the above teaching.

What is claimed is:

1. A method of optimizing a query in a computer system, the query being performed by the computer system to retrieve data from a database stored on the comparer system, the method comprising:
   (a) identifying a correlated subquery in the query that qualifies for transformation;
   (b) transitively dosing a local filtering predicate within the identified correlated subquery that is on a same column as a correlation join predicate within the identified correlated subquery;
   (c) pulling out the transitively closed predicate from the correlated subquery to a parent query block of the query in order to create an optimized query; and
   (d) performing the optimized query in the computer system—such that data is retrieved and outputted from the database.

2. The method of claim 1, wherein the identifying step comprises recognizing that the correlated subquery is a Boolean term predicate that does not contain negation and the correlated subquery does not contain a COUNT arithmetic function.

3. The method of claim 2, wherein the correlated subquery comprises an EXISTS correlated subquery, COL IN correlated subquery, COL=ANY correlated subquery, or COL=correlated subquery, but not a NOT EXISTS correlated subquery or a correlated subquery that contains a COUNT arithmetic function.

4. The method of claim 2, wherein the identifying step comprises recognizing that the correlated subquery includes the local filtering predicate on the same column as the correlation join predicate.

5. The method of claim 1, wherein the transitively closing step comprises performing a predicate transitive closure of the local filtering predicate.

6. The method of claim 1, wherein the pulling out step comprises bubbling up the transitively closed predicate to the parent query block of the query.

7. The method of claim 1, wherein the transitively closed predicate is applied to a table referenced in the parent query block.

8. The method of claim 7, further comprising accessing the table referenced by the transitively closed predicate via a new access path.

9. The method of claim 6 or 7, further comprising applying the transitively closed predicate prior to performing the correlated subquery, thereby resulting in fewer executions of the correlated subquery.

10. A computer-implemented apparatus for optimizing a query, comprising:
    a computer system;
    logic, performed by the computer system, for
    (a) identifying a correlated subquery in the query that qualifies for transformation;
    (b) transitively dosing a local filtering predicate within the identified correlated subquery that is on a same column as a correlation join predicate within the identified correlated subquery;
    (c) pulling out the transitively closed predicate from the correlated subquery to a parent query block of the query in order to create an optimized query; and
    (d) performing the optimized query in the computer system—such that data is retrieved and outputted from the database.

11. The apparatus of claim 10, wherein the logic for identifying comprises logic for recognizing that the correlated subquery is a Boolean term predicate that does not contain negation and the correlated subquery does not contain a COUNT arithmetic function.

12. The apparatus of claim 11, wherein the correlated subquery comprises an EXISTS correlated subquery, COL IN correlated subquery, COL=ANY correlated subquery, or COL=correlated subquery, but not a NOT EXISTS correlated subquery or a correlated subquery that contains a COUNT arithmetic function.

13. The apparatus of claim 11, wherein the logic for identifying comprises logic for recognizing that the correlated subquery includes the local filtering predicate on the same column as the correlation loin predicate.

14. The apparatus of claim 10, wherein the logic for transitively dosing comprises logic for performing a predicate transitive closure of the local filtering predicate.

15. The apparatus of claim 10, wherein the logic for pulling out comprises logic for bubbling up the transitively closed predicate to the parent query block of the query.

16. The apparatus of claim 10, wherein the transitively closed predicate is applied to a table referenced in the parent query block.

17. The apparatus of claim 16, further comprising logic for accessing the table referenced by the transitively closed predicate via a new access path.

18. The apparatus of claim 15 or 16, further comprising logic for applying the transitively closed predicate prior to performing the correlated subquery, thereby resulting in fewer executions of the correlated subquery.

19. An article of manufacture comprising a computer-readable storage device embodying instructions that, when read and executed by a computer system, results in the computer system performing a method for optimizing a query, the query being performed by the computer system to retrieve data from a database stored in a data storage device coupled to the computer system, the method comprising:
  (a) identifying a correlated subquery in the query that qualifies for transformation;
  (b) transitively closing a local filtering predicate within the identified correlated subquery that is on a same column as a correlation join predicate within the identified correlated subquery;
  (c) pulling our the transitively closed predicate from the correlated subquery to a parent query block of the query in order to create an optimized query; and
  (d) performing the optimized query in the computer system—such that data is retrieved and outputted from the database.

20. The article of claim 19, wherein the identifying step comprises recognizing that the correlated subquery is a Boolean term predicate that does not contain negation and the correlated subquery does not contain a COUNT arithmetic function.

21. The article of claim 20, wherein the correlated subquery comprises an EXISTS correlated subquery, COL IN correlated subquery, COL=ANY correlated subquery, or COL=correlated subquery, but not a NOT EXISTS correlated subquery or a correlated subquery that contains a COUNT arithmetic function.

22. The article of claim 20, wherein the identifying step comprises recognizing that the correlated subquery includes the local filtering predicate on the same column as the correlation join predicate.

23. The article of claim 19, wherein the transitively dosing step comprises performing a predicate transitive closure of the local filtering predicate.

24. The article of claim 19, wherein the pulling out step comprises bubbling up the transitively closed predicate to the parent query block of the query.

25. The article of claim 19, wherein the transitively closed predicate is applied to a table referenced in the parent query block.

26. The article of claim 25, further comprising accessing the table referenced by the transitively closed predicate via a new access path.

27. The article of claim 24 or 25, further comprising applying the transitively closed predicate prior to performing the correlated subquery, thereby resulting in fewer executions of the correlated subquery.

* * * * *